(12) United States Patent
Wang et al.

(10) Patent No.: US 11,128,008 B2
(45) Date of Patent: Sep. 21, 2021

(54) BATTERY MODULE AND ELECTRONIC DEVICE

(71) Applicant: Wistron Corporation, New Taipei (TW)

(72) Inventors: Jun-Hao Wang, New Taipei (TW); Zhao-Ping Fu, New Taipei (TW)

(73) Assignee: Wistron Corporation, New Taipei (TW)

( * ) Notice: Subject to any disclaimer, the term of this patent is extended or adjusted under 35 U.S.C. 154(b) by 183 days.

(21) Appl. No.: 16/380,987

(22) Filed: Apr. 10, 2019

(65) Prior Publication Data

US 2020/0194744 A1 Jun. 18, 2020

(30) Foreign Application Priority Data

Dec. 13, 2018 (CN) .......................... 201811528404.2

(51) Int. Cl.
*H01M 4/02* (2006.01)
*H01M 50/20* (2021.01)
*H01M 10/42* (2006.01)
*H01M 50/147* (2021.01)

(52) U.S. Cl.
CPC ......... *H01M 50/20* (2021.01); *H01M 10/425* (2013.01); *H01M 50/147* (2021.01); *H01M 2220/30* (2013.01)

(58) Field of Classification Search
CPC ....................................................... H01M 4/02
See application file for complete search history.

(56) References Cited

U.S. PATENT DOCUMENTS

| 5,935,729 A * | 8/1999 | Mareno ............... H01M 2/1055 |
| | | 429/100 |
| 2014/0168915 A1 | 6/2014 | Wang |

FOREIGN PATENT DOCUMENTS

TW I510887 12/2015

\* cited by examiner

*Primary Examiner* — Jacob B Marks
(74) *Attorney, Agent, or Firm* — JCIPRNET

(57) ABSTRACT

A battery module is used to accommodate a battery and includes an external card bracket, a battery case, a battery cover, and at least one elastic member. The external card bracket includes at least one first locking portion. The battery case includes at least one second locking portion and at least one first assembly portion. The first locking portion is detachably locked with the second locking portion so that the battery case is assembled onto the external card bracket. The battery cover includes at least one second assembly portion. The second assembly portion is detachably assembled to the first assembly portion such that the battery case and the battery cover define a storage space. The battery is disposed in the storage space. The elastic member is located on the second assembly portion and connects the battery case and the battery cover to limit displacement of the battery cover.

20 Claims, 15 Drawing Sheets

BATTERY MODULE AND ELECTRONIC DEVICE

CROSS-REFERENCE TO RELATED APPLICATION

This application claims the priority benefit of China application serial no. 201811528404.2, filed on Dec. 13, 2018. The entirety of the above-mentioned patent application is hereby incorporated by reference herein and made a part of this specification.

BACKGROUND

Technical Field

The disclosure relates to a battery module and an electronic device. More particularly, the disclosure relates to a battery module which can be conveniently assembled and disassembled, and an electronic device adopting the battery module.

Description of Related Art

In order to effectively release the configuration space of an electronic device, the battery module originally disposed on the motherboard and locked with a lateral side of the housing is moved to the rear end of an external card. The external card is disposed at the front end of the battery module, and a DIMM module is disposed at the rear end of the battery module, so no additional space is provided on the motherboard for the battery module to be placed on and secured. Further, in an existing battery module, two or three plastic members be used, that is, a battery case and a latch, or a battery case, a latch, and a partition are included most of the time. The battery case and the battery cover are assembled through locking of multiple locking hooks, so the battery case and the battery cover may not be easily disassembled after being assembled, and much effort and time is also wasted. In addition, only one type of battery can be accommodated after the battery case and the battery cover are assembled, so the battery module cannot be commonly used.

SUMMARY

The disclosure provides a battery module which can be rapidly assembled and disassembled without a tool and may be commonly used.

The disclosure further provides an electronic device including the battery module and occupying less configuration space on a motherboard.

The battery module of the disclosure is configured to accommodate a battery and includes an external card bracket, a battery case, a battery cover, and at least one elastic member. The external card bracket includes at least one first locking portion. The battery case includes at least one second locking portion and at least one first assembly portion. The first locking portion is detachably locked with the second locking portion so that the battery case is assembled onto the external card bracket. The battery cover includes at least one second assembly portion. The second assembly portion is detachably assembled to the first assembly portion such that the battery case and the battery cover define a storage space. The battery is disposed in the storage space. The elastic member is located on the second assembly portion of the battery cover and connects the battery case and the battery cover to limit displacement of the battery cover.

The electronic device of the disclosure accommodates a battery and includes a housing, a motherboard, and a battery module. The housing has a bottom surface. The motherboard is disposed on the bottom surface of the housing. The battery module is reversely assembled onto the bottom surface of the housing and is configured to accommodate the battery. The battery module includes an external card bracket, a battery case, a battery cover, and at least one elastic member. The external card bracket is abutted against the motherboard and includes at least one first locking portion. The battery case includes at least one second locking portion and at least one first assembly portion. The first locking portion is detachably locked with the second locking portion so that the battery case is assembled onto the external card bracket. The battery cover includes at least one second assembly portion. The second assembly portion is detachably assembled to the first assembly portion such that the battery case and the battery cover define a storage space. The battery is disposed in the storage space. The elastic member is located on the second assembly portion of the battery cover and connects the battery case and the battery cover to limit displacement of the battery cover.

To sum up, in the design of the battery module provided by the disclosure, the battery case is assembled onto the external card bracket as the locking portions are detachably locked, and the battery case and the battery cover defining the storage space accommodating the battery are connected through the elastic member. Compared to a conventional battery module in the prior art which may not be easily (or cannot be) disassembled after being assembled, the battery module provided by the disclosure has a simple structure and can be conveniently assembled and disassembled. In addition, since the battery module is reversely assembled onto the bottom surface of the housing, the battery case and the battery cover are suspended from the external card bracket in the reverse direction. Hence, only the external card bracket is abutted against the motherboard, the configuration space on the motherboard is not occupied by the battery case nor the battery cover accommodating the battery. In this way, the electronic device adopting the battery module provided by the disclosure may feature favorable configuration flexibility.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
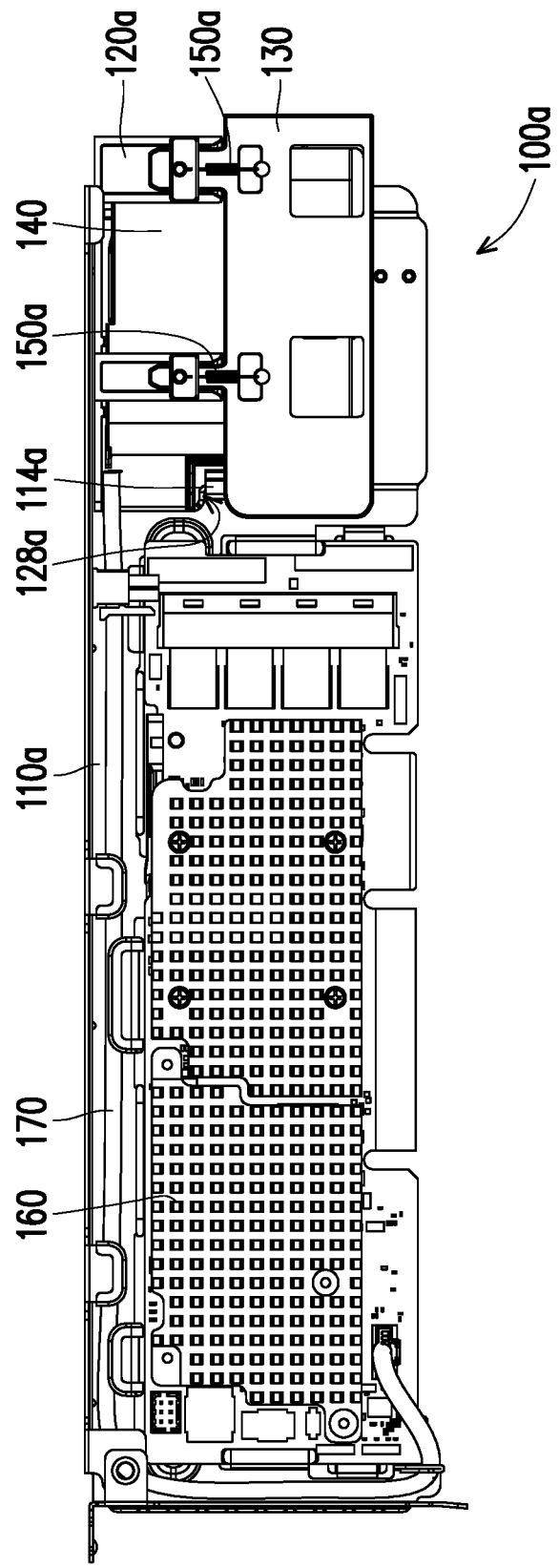
FIG. 1A is a schematic top view illustrating the battery module according to an embodiment of the disclosure.
Figure 1B:
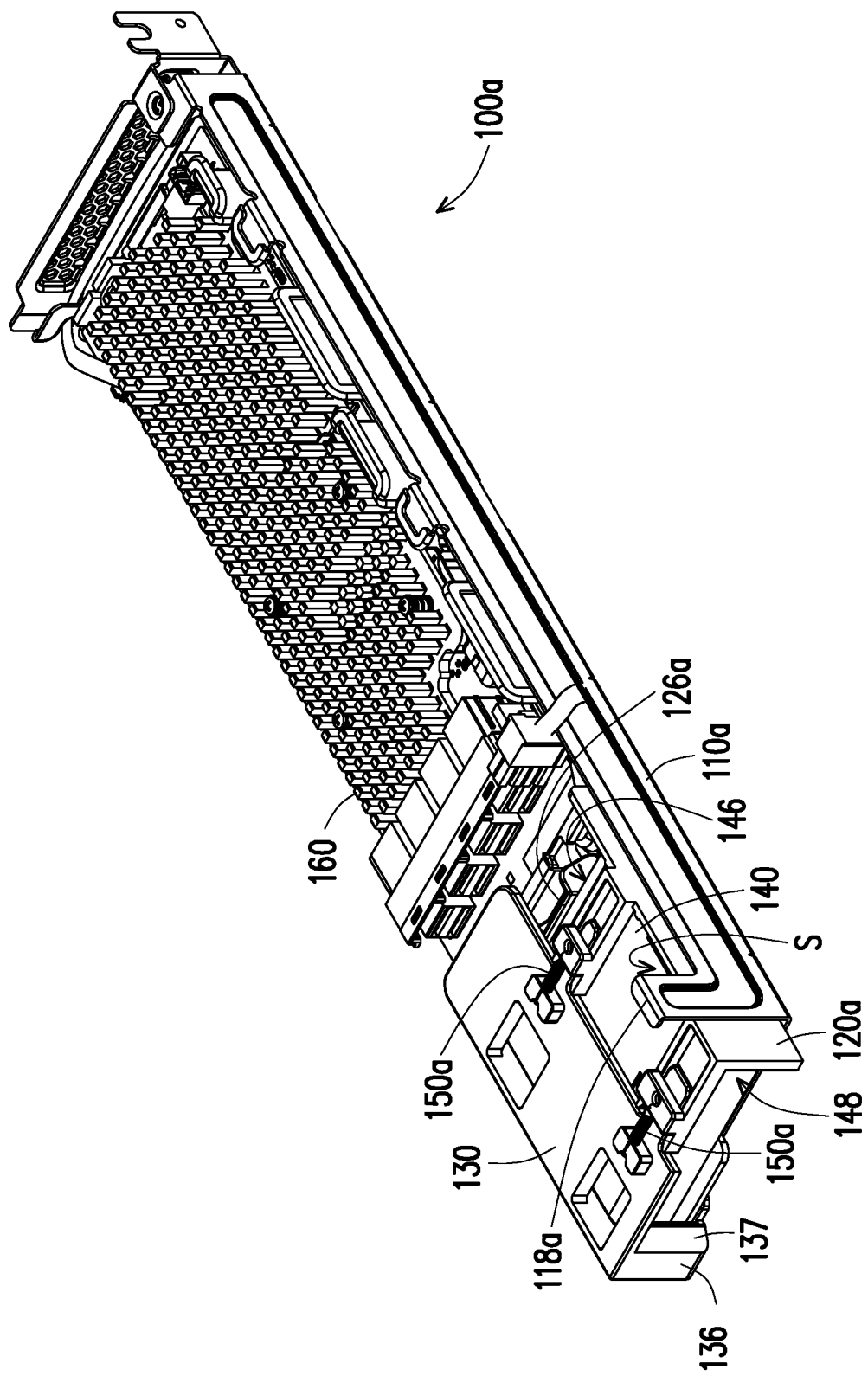
FIG. 1B is a schematic view of the battery module in FIG. 1A.
Figure 1C:
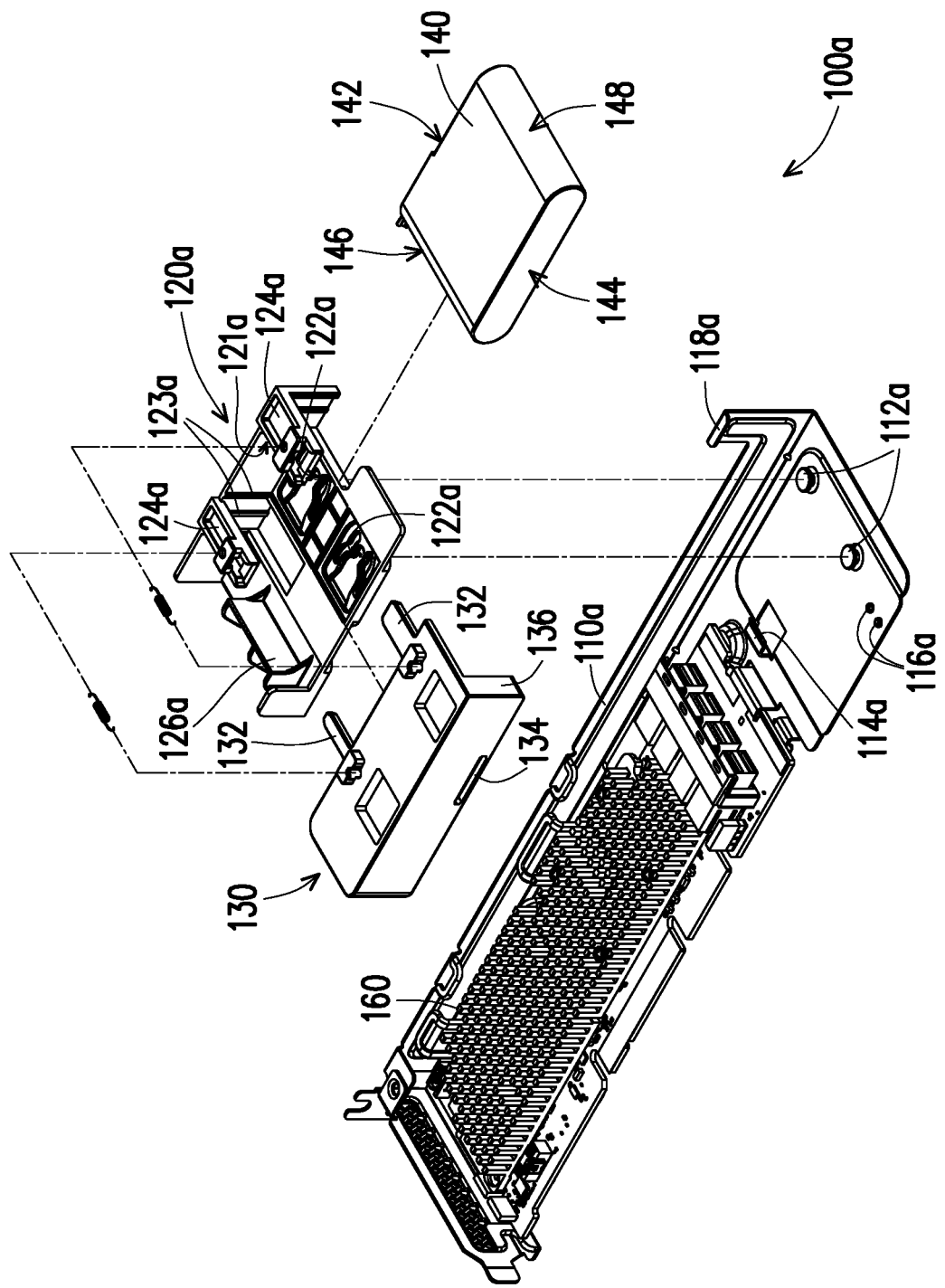
FIG. 1C is a schematic exploded view of the battery module in FIG. 1A.
Figure 1D:
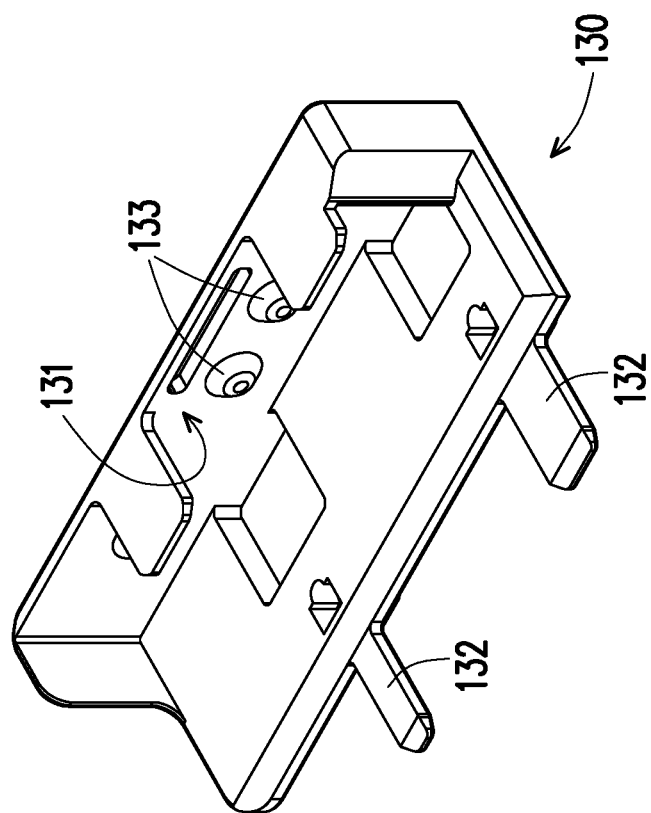
FIG. 1D is a schematic view of the battery cover in FIG. 1C from another viewing angle.
Figure 2A:
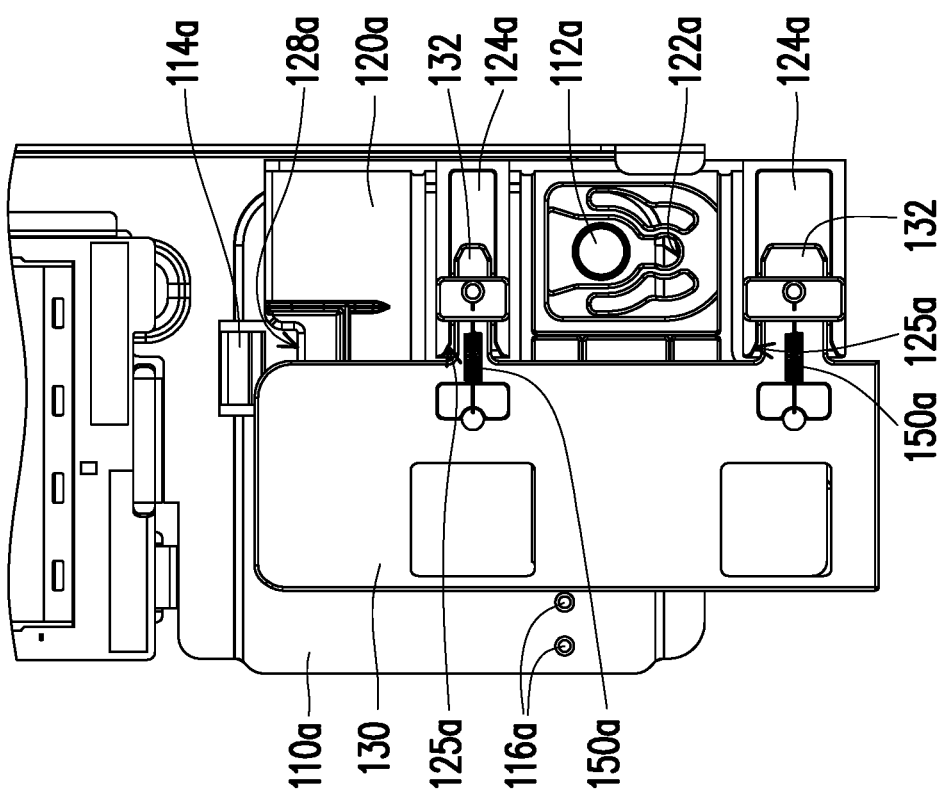
FIG. 2A and FIG. 2B respectively are schematic top views of the battery case of the battery module in FIG. 1A before and after being assembled to the external card bracket.
Figure 2B:
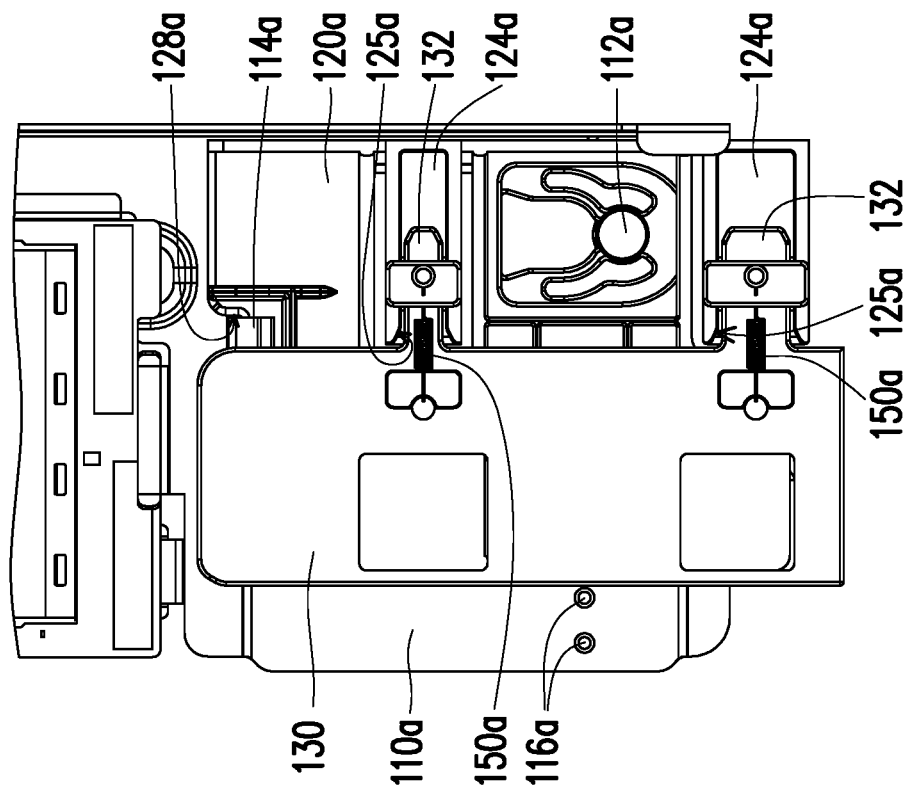
Figure 2C:
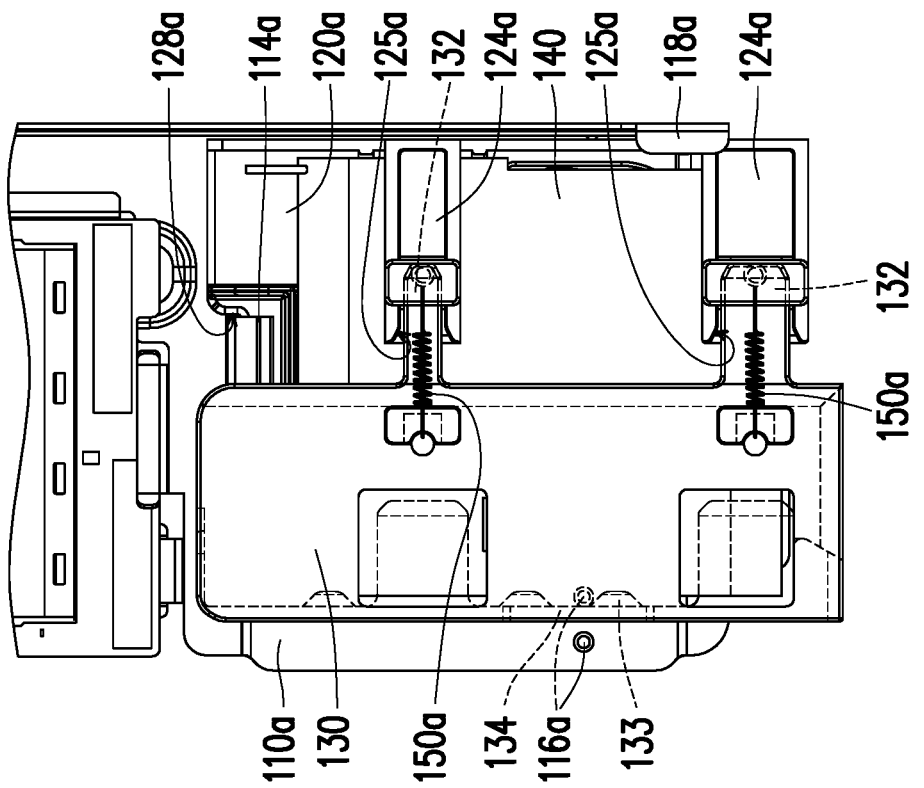
FIG. 2C is a schematic top view of the elastic arm of the battery cover crossing over the position limiting protrusions of the external card bracket after the battery of the battery module in FIG. 1A is disposed in the storage space.
Figure 2D:
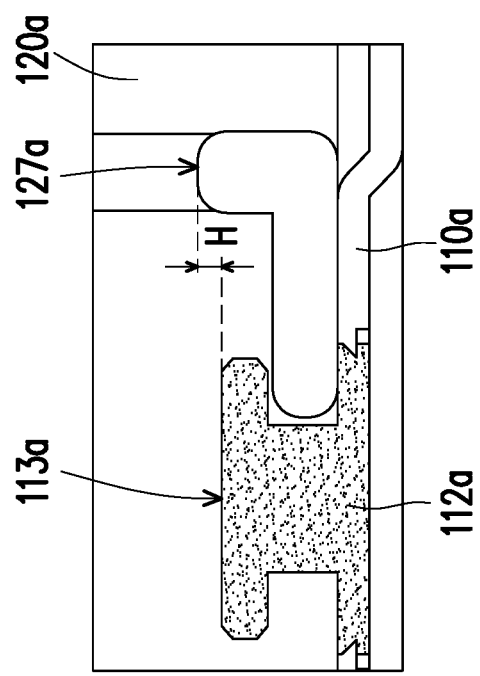
FIG. 2D is a schematic cross-sectional view of the height difference between the top surface of the first locking portion of the external card bracket of the battery module and the assembly sliding surface of the battery case in FIG. 1A.

FIG. 1A is a schematic top view illustrating the battery module according to an embodiment of the disclosure. FIG. 1B is a schematic view of the battery module in FIG. 1A. FIG. 1C is a schematic exploded view of the battery module in FIG. 1A. FIG. 1D is a schematic view of the battery cover in FIG. 1C from another viewing angle. FIG. 2A and FIG. 2B respectively are schematic top views of the battery case of the battery module in FIG. 1A before and after being assembled to the external card bracket. FIG. 2C is a schematic top view of the elastic arm of the battery cover crossing over the position limiting protrusions of the external card bracket after the battery of the battery module in FIG. 1A is disposed in the storage space. FIG. 2D is a schematic cross-sectional view of the height difference between the top surface of the first locking portion of the external card bracket of the battery module and the assembly sliding surface of the battery case in FIG. 1A. For the convenience of description, an electric wire is not depicted in FIG. 1C.

With reference to FIG. 1A, FIG. 1B, and FIG. 1C together, in this embodiment, a battery module 100a is configured to accommodate a battery 140, and the battery module 100a includes an external card bracket 110a, a battery case 120a, a battery cover 130, and at least one elastic member 150a (two are schematically shown). The external card bracket 110a includes at least one first locking portion 112a (two are schematically shown). The battery case 120a includes at least one second locking portion 122a (two are schematically shown) and at least one first assembly portion 124a (two are schematically shown). The first locking portions 112a are detachably locked with the second locking portions 122a, so that the battery case 120a is assembled onto the external card bracket 110a. The battery cover 130 includes at least one second assembly portion 132 (two are schematically shown). The second assembly portions 132 are detachably assembled to the first assembly portions 124a, so that the battery case 120a and the battery cover 130 define a storage space S. The battery 140 is disposed in the storage space S. The elastic members 150a are located on the second assembly portions 132 of the battery cover 130 and connect the battery case 120a and the battery cover 130 to limit displacement of the battery cover 130.

More specifically, with reference to FIG. 2A, FIG. 2B, and FIG. 2D together, in this embodiment, the battery case 120a is assembled onto the external card bracket 110a through a locking manner. One of the first locking portion 112a of the external card bracket 110a and the second locking portion 122a of the battery case 120a is a locking block, and the other one of the first locking portion 112a and the second locking portion 122a is a locking slot. Herein, the first locking portion 112a of the external card bracket 110a is implemented as a H-shaped locking block, and the second locking portion 122a of the battery case 120a is implemented as an elastic locking slot, but are not limited thereto. During assembly, the elastic locking slot generates elastic deformation, and after the H-shaped locking block is assembled, the elastic locking slot is restored to an original shape and is engaged with the H-shaped locking block. That is, through the H-shaped locking block locked with the elastic locking slot, six degrees of freedom of the external card bracket 110a and the battery case 120a in an X direction, a Y direction, and a Z direction are limited. In order to ensure that the battery 140 (with reference to FIG. 1C) may smoothly slide in the battery case 120a, a height difference H is provided between a top surface 113a of the first locking portion 112a and an assembly sliding surface 127a of the battery case 120a. Preferably, the height difference H is greater than 0.5 millimeter, so that assembling and sliding may be smoothly performed.

With reference to FIG. 1A, FIG. 2A, and FIG. 2B together, in order to further limit the battery case 120a to be positioned on the external card bracket 110a, the external card bracket 110a of this embodiment may further include a third locking portion 114a, and the battery case 120a may further include a fourth locking portion 128a. The third locking portion 114a is detachably locked with the fourth locking portion 128a, so that the battery case 120a is secured onto the external card bracket 110a. One of the third locking portion 114a and the fourth locking portion 128a is a locking hook, and the other one of the third locking portion 114a and the fourth locking portion 128a is an opening slot. Herein, the third locking portion 114a of the external card bracket 110a is implemented as the locking hook, and the fourth locking portion 128a of the battery case 120a is implemented as the opening slot, but are not limited thereto. During assembly, in response to that the first locking portion 112a of the external card bracket 110a is locked with the second locking portion 122a of the battery case 120a, the third locking portion 114a is locked with the fourth locking portion 128a at the same time, so that the battery case 120a is limited to be positioned onto the external card bracket 110a.

Further, with reference to FIG. 1B, FIG. 1C, and FIG. 2A together, in this embodiment, the battery cover 130a and the battery case 120a are assembled to each other to define the storage space S accommodating the battery 140. One of the first assembly portion 124a of the battery case 120a and the second assembly portion 132 of the battery cover 130 is an inserting slot, and the other one of the first assembly portion 124a and the second assembly portion 132 is a tongue piece. Herein, the first assembly portion 124a of the battery case 120a is implemented as the inserting slot, and the second assembly portion 132 of the battery cover 130 is implemented as the tongue piece, but are not limited thereto. When the tongue piece is inserted into the inserting slot, the battery cover 130 and the battery case 120a are assembled together. In order to allow the tongue piece to enter into the inserting slot more easily, in this embodiment, the inserting slot further includes a guiding opening 125a to guide the tongue piece to be inserted into the inserting slot, so that assembly is performed more conveniently.

In order to limit the displacement of the battery cover 130 relative to the battery case 120a, the elastic member 150a is disposed on the second assembly portion 132 of the battery cover 130 and connects the battery case 120a and the battery cover 130. Herein, the elastic member 150a is implemented as a tensile spring, but is not limited thereto. When the battery cover 130 is pulled by an external force, the battery cover 130 may move within an elasticity range of the elastic member 150a. At this time, a size of the storage space S defined by the battery case 120a and the battery cover 130 is changed according to elastic deformation of the elastic member 150a. In other words, the battery 140 in the battery module 100a of this embodiment is not limited to one specification only, and thereby, the battery module 100a may be commonly used. In addition, only the elasticity of the elastic member 150a is required to disassemble the battery 140 of this embodiment. In response to that the battery cover 130 is pulled, the battery 140 is pulled out or pushed in, and favorable convenience is thereby provided. In addition, the battery module 100a of this embodiment may further include an external card 160 assembled onto the external card bracket 110a and is electrically connected to the battery 140. Herein, the external card 160 may be electrically connected to the battery 140 through an electric wire 170. The external card 160 may be, for example, a redundant array of independent disk (RAID) card or other suitable external cards, which is not limited in this regard.

In order to ensure that the battery 140 can be smoothly assembled, with reference to FIG. 1C and FIG. 1D together, the battery case 120a of this embodiment may have a first inner side wall 121a and a first protruding portion 123a (several are schematically shown) disposed on the first inner side wall 121a. The battery cover 130 has a second inner side wall 131 and a second protruding portion 133 (several are schematically shown) disposed on the second inner side wall 131. One of the first protruding portion 123a and the second protruding portion 133 is a boss, and the other one of the first protruding portion 123a and the second protruding portion 133 is a rib. Herein, the first protruding portion 123a of the battery case 120a is implemented as a long rib, and the second protruding portion 133 of the battery cover 130 is implemented as a beveled smooth boss, but are not limited thereto. Two opposite side surfaces 142 and 144 of the battery 140 are in contact with the first protruding portion 123a and the second protruding portion 133 respectively. That is, the side surfaces 142 and 144 of the battery 140 are not in full contact with the battery case 120a and the battery cover 130, so that the battery 140 may be assembled to the storage space S more smoothly.

Further, in order to effectively position the battery 140, with reference to FIG. 1B and FIG. 1C together, the battery case 120a of this embodiment may include a front blocking plate 126a, and the battery cover 130 may include a rear blocking plate 136. A front side surface 146 and a rear side surface 148 of the battery 140 are respectively abutted against the front blocking plate 126a and the rear blocking plate 136. In order to ensure that assembly may be smoothly performed, the rear blocking plate 136 of this embodiment may have a guiding inclined surface 137 to guide the battery 140 to enter the storage space S. In addition, with reference to FIG. 1C and FIG. 2C, the external card bracket 110a of this embodiment further includes at least one position limiting protrusion 116a (two are schematically shown), and the battery cover 130 has an elastic arm 134. In response to that the battery 140 enters the storage space S, the battery cover 130 is pushed by an external force, and the elastic arm 134 crosses the position limiting protrusions 116a. In response to that the battery 140 is assembled, the position limiting protrusions 116a may limit the displacement of the battery cover 130, so as to secure the battery cover 130 more firmly.

Figure 3A:
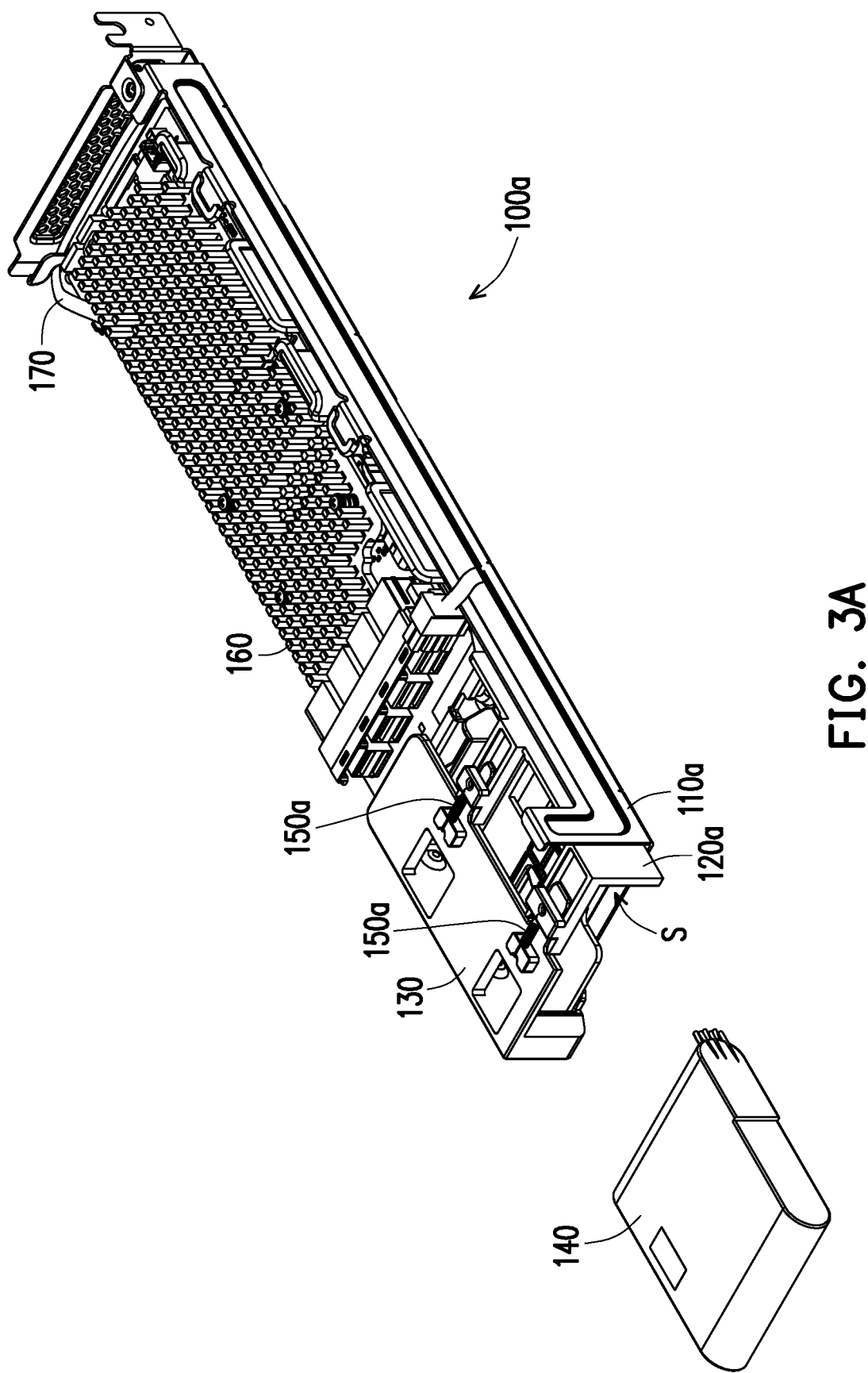
FIG. 3A and FIG. 3B are schematic views of two assembly methods of the battery module in FIG. 1A.
Figure 3B:
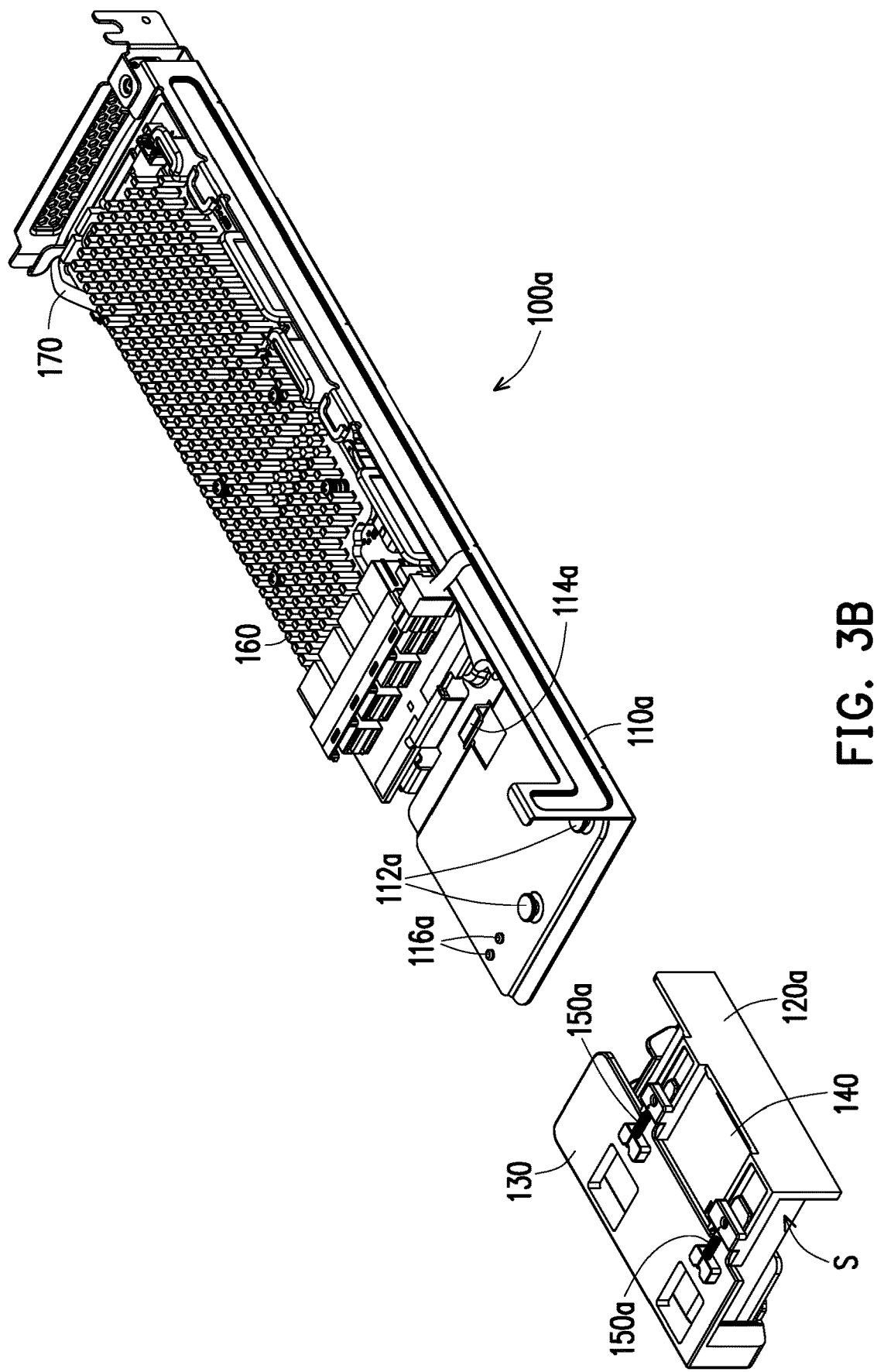

Note that this embodiment is not intended to limit the assembly order of the battery module 100a. FIG. 3A and FIG. 3B are schematic views of two assembly methods of the battery module in FIG. 1A. With reference to FIG. 3A first, during assembly, the battery case 120a may be assembled to the battery cover 130 first. Next, the battery case 120 is locked with the external card bracket 110. Finally, the battery 140 is placed in the storage space S defined by the battery case 120a and the battery cover 130, and assembly is thereby completed. Alternatively, with reference to FIG. 3B, during assembly, the battery case 120a may be assembled to the battery cover 130 first. Next, the battery 140 is placed in the storage space S defined by the battery case 120a and the battery cover 130. Finally, the battery case 120 is locked with the external card bracket 110, and that assembly is completed. In short, in the battery module 100a of the embodiment, the assembly order of the elements may be changed, so that favorable assembly flexibility is provided.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiment for the omitted contents, which will not be repeated hereinafter.

Figure 4:
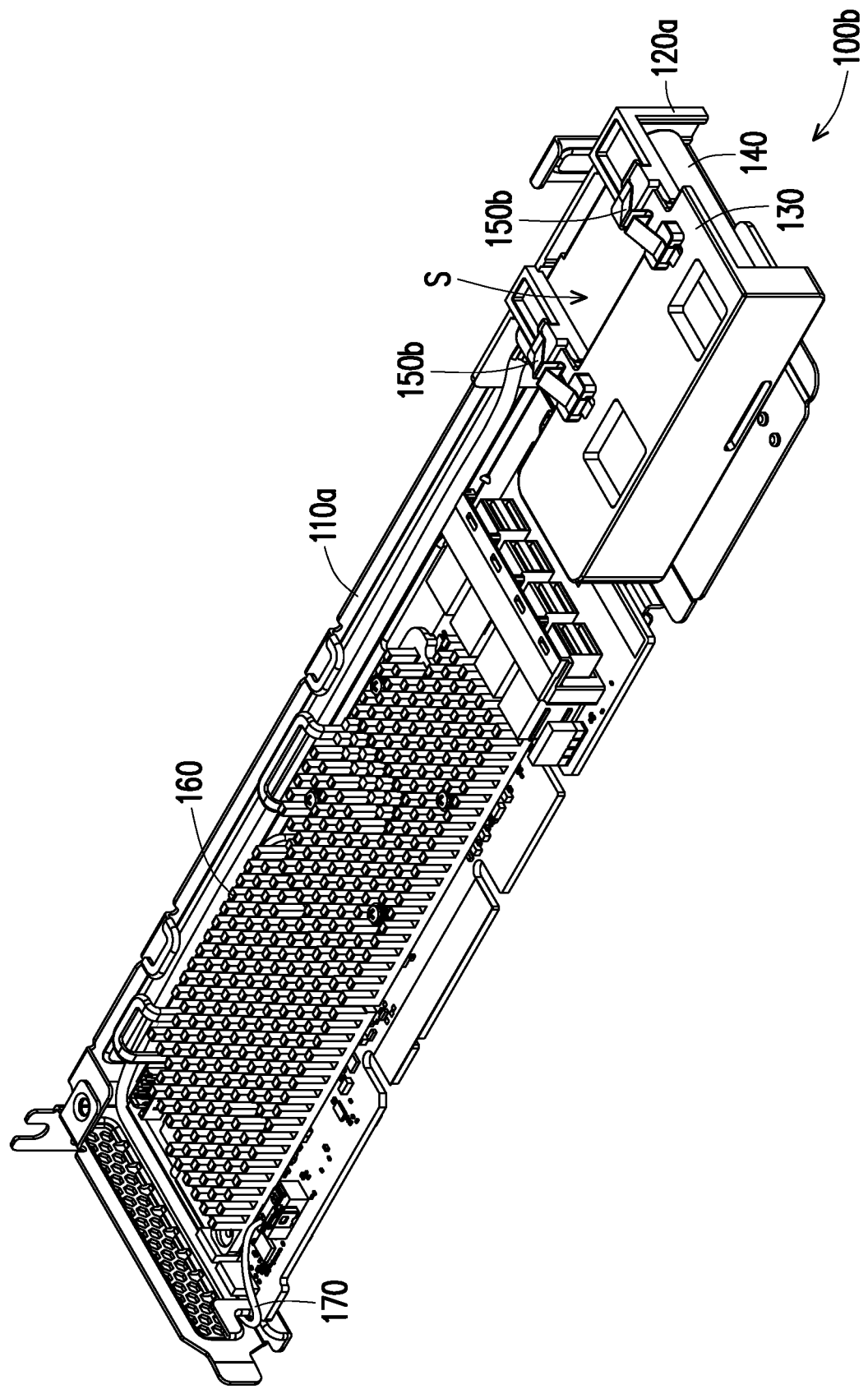
FIG. 4 is a schematic view of the battery module according to another embodiment of the disclosure.

FIG. 4 is a schematic view of the battery module according to another embodiment of the disclosure. With reference to FIG. 1B and FIG. 4 first, a battery module 100b of this embodiment is similar to the battery module 100a of FIG. 1B, and the difference therebetween is that: an elastic member 150b of this embodiment is implemented as a stainless elastic piece having a U-shaped notch. Herein, the stainless elastic piece having the U-shaped notch is designed to be bilaterally symmetrical, so in response to that the battery cover 130 is pulled, the stainless elastic piece generates deformation in the U-shaped notch. The size of the storage space S may be changed according to flexibility of the stainless elastic piece, so that storage space S may accommodate the battery 140 of different sizes. In short, the battery module 100b of this embodiment may be commonly used.

Figure 5A:
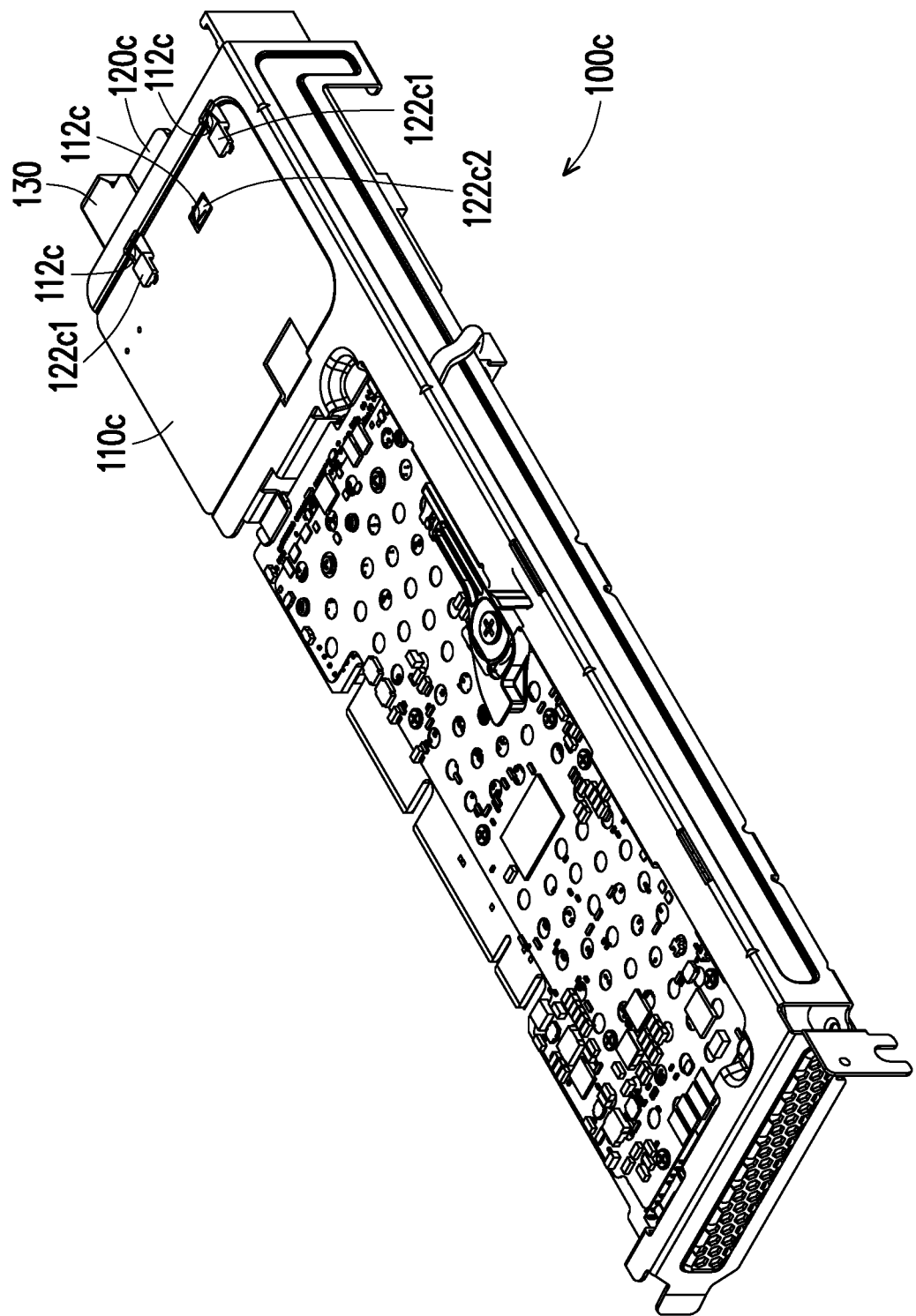
FIG. 5A is a schematic view of the battery module according to another embodiment of the disclosure.
Figure 5B:
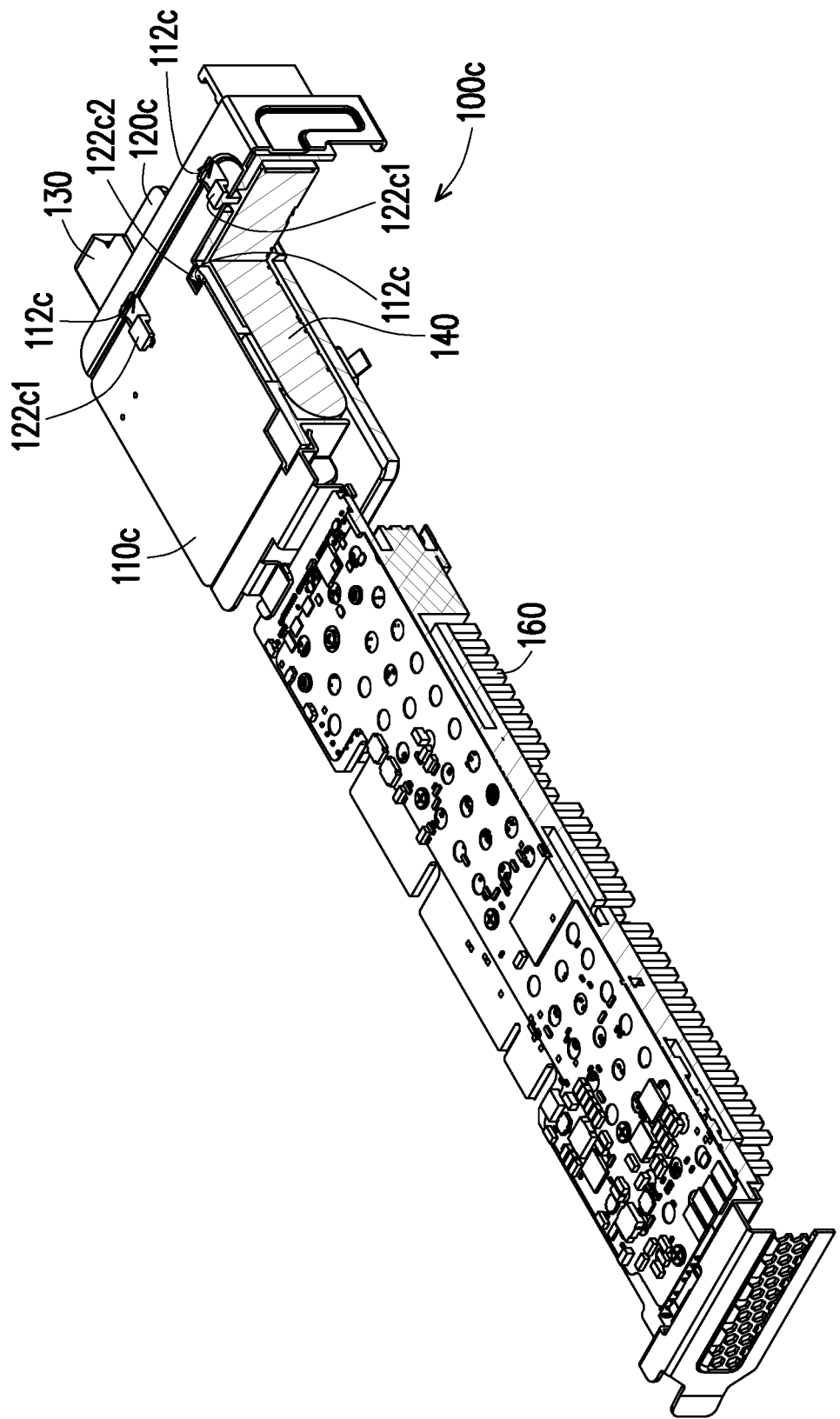
FIG. 5B is part of a schematic view of a cross-section of the battery module in FIG. 5A.
Figure 5C:
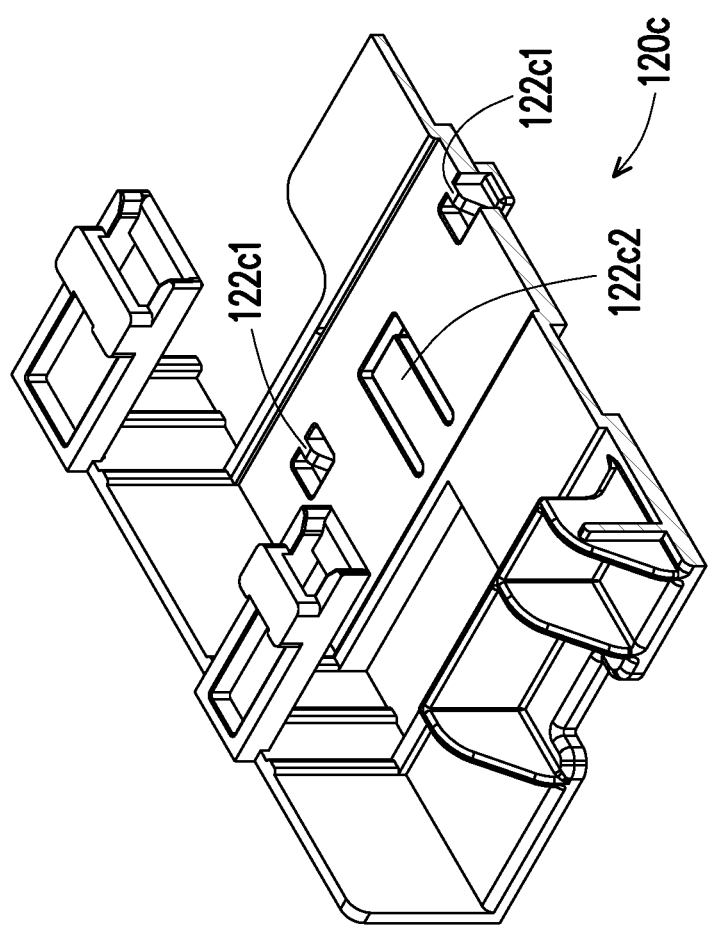
FIG. 5C is part of a schematic view of a cross-section of the battery case of the battery module in FIG. 5A from another viewing angle.

FIG. 5A is a schematic view of the battery module according to another embodiment of the disclosure. FIG. 5B is part of a schematic view of a cross-section of the battery module in FIG. 5A. FIG. 5C is part of a schematic view of a cross-section of the battery case of the battery module in FIG. 5A from another viewing angle. For the convenience of description, each of the battery modules in FIG. 5A and FIG. 5B is shown with a bottom surface, and the battery case of FIG. 5C is shown with a front surface.

With reference to FIG. 5A, FIG. 5B, FIG. 5C, and FIG. 1C together, a battery module 100c of this embodiment is similar to the battery module 100a of FIG. 1C, and the difference therebetween is that: at least one first locking portion of an external card bracket 110c of this embodiment is implemented as three locking slots 112c, at least one second locking portion of a battery case 120c is implemented as two locking hooks 122c1 and one reverse buckle 122c2, and the reverse buckle 122c2 is located between the locking hooks 122c1.

Specifically, the external card bracket 110c of this embodiment is matched with the battery case 120c through three engaging supporting points. During assembly, the reverse buckle 122c2 of the battery case 120c is locked with one of the locking slots 112c of the external card bracket 110c, so as to limit displacement of the battery case 120c in the X direction (i.e., the front and back direction). The locking hooks 122c of the battery case 120c is locked with the other two locking slots 112c of the external card bracket 110c, so as to limit displacements of the battery case 120c in the Y direction and in the Z direction. During disassembly, a user only has to press the reverse buckle 122c2 of the battery case 120c to disassemble the battery case 120c from the external card bracket 110c. In short, the battery module 100c of this embodiment may be rapidly assembled or disassembled without a tool, and thus favorable assembly convenience is provided.

Figure 6:
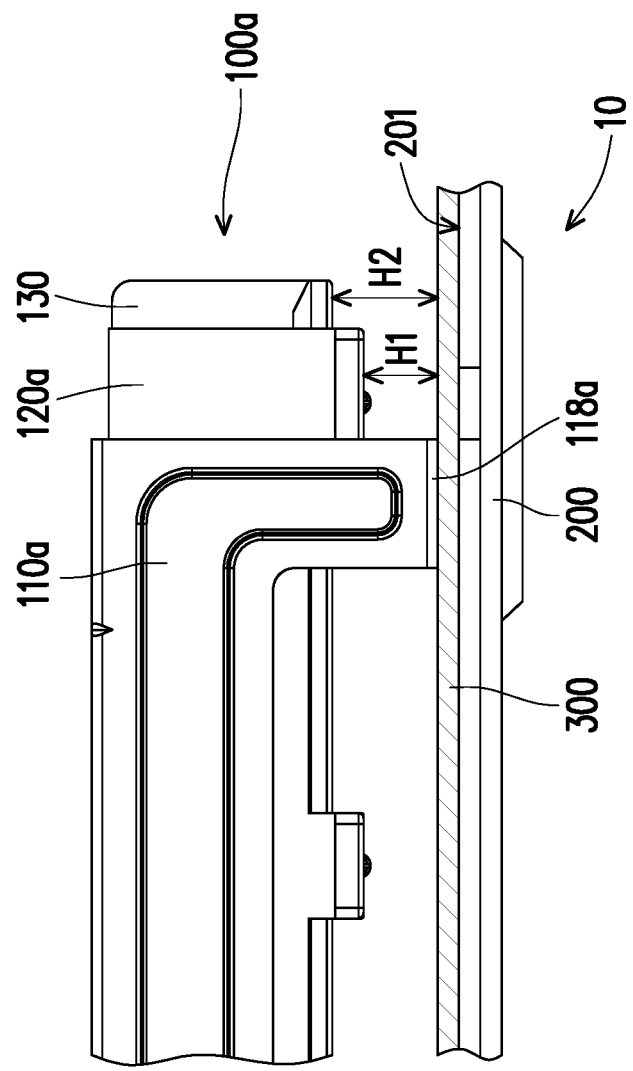
FIG. 6 is a schematic view of the electronic device according to another embodiment of the disclosure.

FIG. 6 is a schematic view of the electronic device according to another embodiment of the disclosure. With reference to FIG. 1B and FIG. 6 together, an electronic device 10 of this embodiment accommodates the battery 140 and includes a housing 200, a motherboard 300, and the battery module 100a. Specifically, the housing 200 of this embodiment has a bottom surface 201, and the motherboard 300 is disposed on the bottom surface 201 of the housing 200. The battery module 100a is reversely assembled onto the bottom surface 201 of the housing 200, and an abutting portion 118a of the external card bracket 110a is abutted against the motherboard 300. The battery case 120a of the battery module 100a is assembled onto the external card bracket 110a, and the battery cover 130 and the battery case 120a are assembled to each other. Hence, in response to that the battery module 100a is reversely assembled onto the bottom surface 201 of the housing 200, the battery case 120a and the battery cover 130 are suspended from the external card bracket 110a in a reverse direction. As shown in FIG. 6, a first height difference H1 is provided between the battery case 120a and the motherboard 300, a second height difference H2 is provided between the battery cover 130 and the motherboard 300, and the second height difference H2 is greater than the first height difference H1.

In short, since the battery module 100a of this embodiment is assembled in the housing 200 in the form of a module and is reversely assembled onto the bottom surface 201 of the housing 200, the battery case 120a and the battery cover 130 are suspended from the external card bracket 110a in the reverse direction. Hence, only the abutting portion 118a of the external card bracket 110a is abutted against the motherboard 300, a configuration space on the motherboard 300 is not occupied by the battery case 120a nor the battery cover 130, so that favorable configuration flexibility is provided by the electronic device 10 of this embodiment.

In view of the foregoing, in the design of the battery module provided by the disclosure, the battery case is assembled onto the external card bracket as the locking portions are detachably locked, and the battery case and the battery cover defining the storage space accommodating the battery are connected through the elastic member. Compared to a conventional battery module in the prior art which may not be easily (or cannot be) disassembled after being assembled, the battery module provided by the disclosure has a simple structure and can be conveniently assembled and disassembled. In addition, since the battery module is reversely assembled onto the bottom surface of the housing, the battery case and the battery cover are suspended from the external card bracket in the reverse direction. Hence, only the external card bracket is abutted against the motherboard, and the configuration space on the motherboard is not occupied by the battery case nor the battery cover accommodating the battery. In this way, the electronic device adopting the battery module provided by the disclosure may feature favorable configuration flexibility.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A battery module, comprising:
an external card bracket, comprising at least one first locking portion;
a battery case, comprising at least one second locking portion and at least one first assembly portion, wherein the at least one first locking portion is detachably locked with the at least one second locking portion so that the battery case is assembled onto the external card bracket;
a battery cover, comprising at least one second assembly portion, wherein the at least one second assembly portion is detachably assembled to the at least one first assembly portion; and
at least one elastic member, located on the at least one second assembly portion of the battery cover, connecting the battery case and the battery cover to limit displacement of the battery cover, wherein the battery case, the battery cover and the at least one elastic member define a resizable storage space for accommodating a battery of different sizes.

2. The battery module as claimed in claim 1, wherein one of the at least one first locking portion and the at least one second locking portion is a locking block, and the other one of the at least one first locking portion and the at least one second locking portion is a locking slot.

3. The battery module as claimed in claim 1, wherein the at least one first locking portion comprises three locking slots, the at least one second locking portion comprises two locking hooks and one reverse buckle, the reverse buckle is located between the locking hooks, the reverse buckle is locked with one of the locking slots to limit displacement of the battery case in an X direction, and the locking hooks are locked with the other two locking slots to limit displacements of the battery case in a Y direction and a Z direction.

4. The battery module as claimed in claim 1, wherein one of the at least one first assembly portion and the at least one of the second assembly portion is an inserting slot, and the other one of the at least one first assembly portion and the at least one second assembly portion is a tongue piece.

5. The battery module as claimed in claim 4, wherein the inserting slot has a guiding opening to guide the tongue piece to be inserted into the inserting slot.

6. The battery module as claimed in claim 1, wherein the battery case has a first inner side wall and a first protruding portion disposed on the first inner side wall, the battery cover has a second inner side wall and a second protruding portion disposed on the second inner side wall, and two opposite side surfaces of the battery are respectively in contact with the first protruding portion and the second protruding portion.

7. The battery module as claimed in claim 6, wherein one of the first protruding portion and the second protruding portion is a boss, and the other one of the first protruding portion and the second protruding portion is a rib.

8. The battery module as claimed in claim 1, wherein the battery case comprises a front blocking plate, the battery cover comprises a rear blocking plate, and a front side surface and a rear side surface of the battery are respectively abutted against the front blocking plate and the rear blocking plate.

9. The battery module as claimed in claim 8, wherein the rear blocking plate has a guiding inclined surface to guide the battery to enter the storage space.

10. The battery module as claimed in claim 1, wherein a height difference is provided between a top surface of the at least one first locking portion and an assembly sliding surface of the battery case.

11. The battery module as claimed in claim 1, wherein the external card bracket further comprises a third locking portion, the battery case further comprises a fourth locking portion, and the third locking portion is detachably locked with the fourth locking portion so that the battery case is secured onto the external card bracket.

12. The battery module as claimed in claim 11, wherein one of the third locking portion and the fourth locking portion is a locking hook, and the other one of the third locking portion and the fourth locking portion is an opening slot.

13. The battery module as claimed in claim 1, wherein the external card bracket further comprises at least one position limiting protrusion, the battery cover has an elastic arm, and the elastic arm crosses the position limiting protrusion so that the position limiting protrusion limits the displacement of the battery cover.

14. The battery module as claimed in claim 1, wherein a size of the storage space is changed according to elastic deformation of the at least one elastic member.

15. The battery module as claimed in claim 1, wherein the at least one elastic member comprises a tensile spring or a stainless elastic piece having a U-shaped notch.

16. The battery module as claimed in claim 1, further comprising:
an external card, assembled onto the external card bracket and electrically connected to the battery.

17. An electronic device, accommodating a battery, the electronic device-comprising:
a housing, having a bottom surface;
a motherboard, disposed on the bottom surface of the housing; and
a battery module, reversely assembled onto the bottom surface of the housing, configured to accommodate the battery, the battery module comprising:
an external card bracket, abutted against the motherboard, comprising at least one first locking portion;
a battery case, comprising at least one second locking portion and at least one first assembly portion, wherein the at least one first locking portion is detachably locked with the at least one second locking portion so that the battery case is assembled onto the external card bracket;
a battery cover, comprising at least one second assembly portion, wherein the at least one second assembly portion is detachably assembled to the at least one first assembly portion such that the battery case and the battery cover define a storage space, and the battery is disposed in the storage space; and
at least one elastic member, located on the at least one second assembly portion of the battery cover, connecting the battery case and the battery cover to limit displacement of the battery cover.

18. The electronic device as claimed in claim 17, wherein a first height difference is provided between the battery case and the motherboard, a second height difference is provided between the battery cover and the motherboard, and the second height difference is greater than the first height difference.

19. The electronic device as claimed in claim 17, wherein a size of the storage space is changed according to elastic deformation of the at least one elastic member.

20. The electronic device as claimed in claim 17, wherein the battery module further comprises:
an external card, assembled onto the external card bracket and electrically connected to the battery.

* * * * *